United States Patent
Shahine et al.

(10) Patent No.: US 6,624,831 B1
(45) Date of Patent: Sep. 23, 2003

(54) SYSTEM AND PROCESS FOR GENERATING A DYNAMICALLY ADJUSTABLE TOOLBAR

(75) Inventors: Omar H. Shahine, Palo Alto, CA (US); Saiwing Yeung, Sunnyvale, CA (US); David S. Cortright, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 09/690,572

(22) Filed: Oct. 17, 2000

(51) Int. Cl.⁷ ................................. G09G 5/00
(52) U.S. Cl. ................ 345/815; 345/811; 345/825; 345/840
(58) Field of Search ................... 345/810, 811, 345/815, 825, 835, 840

(56) References Cited

U.S. PATENT DOCUMENTS

| | | | | |
|---|---|---|---|---|
| 5,644,737 A | * | 7/1997 | Tuniman et al. | 345/810 |
| 5,897,670 A | * | 4/1999 | Nielsen | 345/866 |
| 6,057,836 A | * | 5/2000 | Kavalam et al. | 345/779 |
| 6,133,915 A | * | 10/2000 | Arcuri et al. | 345/779 |
| 6,232,972 B1 | * | 5/2001 | Arcuri et al. | 345/815 |
| 6,433,801 B1 | * | 8/2002 | Moon et al. | 345/840 |
| 6,469,719 B1 | * | 10/2002 | Kino et al. | 345/810 |

OTHER PUBLICATIONS

"Intelligent Tool Tracker/Display" IBM Technical Disclosure Bulletin vol. 37, Issue 2A, pp. 175–176. Feb., 1994.*

* cited by examiner

Primary Examiner—John Cabeca
Assistant Examiner—Brian Detwiler
(74) Attorney, Agent, or Firm—Lyon & Harr, LLP; Richard T. Lyon

(57) ABSTRACT

A system and process for generating a dynamically adjustable toolbar is presented where the icons and labels associated with toolbar buttons are displayed or not displayed in the available toolbar space based on an assigned set of priorities. This system and process generally involves first identifying all the functions or commands that it is desired to include in a toolbar along with their respective button icons and labels. A priority is then assigned to each label associated with a button and each icon associated with a button. Next, the available toolbar space is determined. The button icons and labels are then displayed in the available toolbar space based on their assigned priority, with the icons and labels having the higher assigned priorities being displayed before those having lower priorities.

21 Claims, 7 Drawing Sheets

SYSTEM AND PROCESS FOR GENERATING A DYNAMICALLY ADJUSTABLE TOOLBAR

BACKGROUND

1. Technical Field

The invention is related to the generation and display of toolbars on a display screen, and more particularly to a system and process for generating and displaying a dynamically adjustable toolbar that optimizes the number and configuration of the toolbar buttons that are displayed in view of the amount of space allotted for the toolbar on the display screen.

2. Background Art

Toolbars are a standard graphical user interface (GUI) element employed in most current software applications. Generally, a toolbar appears to the user as a single row or column of icons on a computer monitor screen, although sometimes a toolbar will have multiple rows or columns of icons. The icons represent various program functions or commands. The user typically interacts with a toolbar by using a pointing device of some type such as a computer mouse to place a cursor displayed on the monitor screen over an icon contained in the toolbar. The user then selects the function or command represented by the icon, such as by clicking the left-hand mouse button. In addition to the icons, text elements in the form of labels are often disposed adjacent to the associated icon. Typically, the label either appears underneath its icon or to the right of the icon. The labels usually identify the function of the associated icon. In that case, the label remains static. For example, the label might read "save", thus identifying the associated icon as representing the save function. The save label would not change. However, the label can also be used to indicate a current state of a function represented by an associated icon. For example, a toolbar icon might represent a category assignment function. This function is often used in personal information management (PIM) programs to categorize an entry as business related or personal. The label associated with the category assignment icon would indicate the currently selected category (e.g., business or personal). Thus, rather than identifying the function of the associated icon, the label indicates its current state. This type of label is not static and will change depending on the selected state of the function represented by the icon. In many current applications the toolbar can be configured to display both the icon and label, the icon only, or the text only. It is noted that the icon and related label combination is often referred to as a toolbar button. However, sometimes an icon without a label is also referred to as a button.

A toolbar is usually associated with an application window typically displayed on a portion of the computer screen. These application windows are graphic user interfaces that are used to present information to a user and to facilitate interaction between the user and the application program associated with the window. When a toolbar is visually attached to a particular application window, it length will be restricted to the size of the window, or even less if the toolbar is allowed to only appear in a portion of the window. Thus, if the toolbar appears as a horizontal row in the window, its length is limited by the width of the window or the width of the portion of the window in which the toolbar is allowed to appear. Likewise, when the toolbar appears as a vertical column in the window, its length will be restricted to the height of the window or some portion of the height. These restrictions on the length of a toolbar limit the number of buttons that can be included in the toolbar. Granted, the icons and labels making up the buttons could be made smaller to fit more in the available toolbar length. However, there is a practical limit to how small the icons and labels can be made and still be recognizable to the user. It is often the case that all of the buttons (with or without text) that it is desired to display in a toolbar will not fit even at the smallest practical scale. A similar issue exists in the case of a global toolbar. A global toolbar is typically independent from an application window and may float over the application window, or be displayed outside the periphery of the window. The length of a global toolbar is at most as long as the width or height of the monitor screen, and may be restricted to an even shorter length. Accordingly, the same issues concerning not being able to include as many buttons as desired pertain to global toolbars as well.

Another toolbar issue arises when the size of an application window or global toolbar can be changed. In the case where the window is made smaller, the toolbars associated with the window typically shrink in length as well. In the case of a global toolbar, it is usually be resized directly. Either way the result is the same. Namely, the space available for existing buttons is reduced.

This same reduction in available toolbar space can also occur when a toolbar has been designed to maximize the space assuming a particular resolution. However, if the program containing the toolbar is run on a system having a lower resolution, more space would be needed for the same number of buttons. For example, current computer monitor resolutions range from 640×480 pixels to 1600×1200 pixels, with 800–600 pixels being the most common resolution. If a toolbar is designed so the maximum number of buttons (with or without text) fit into the allotted space assuming a resolution of 800×600 pixels, they will not all fit in the allotted space when the program is run on a system employing a lower resolution such as the 640×480 pixels typical of many older computer monitors. Assuming that the buttons cannot be scaled down any further without becoming illegible, there is an issue as to what to do with the buttons that will no longer fit.

One attempt at addressing the foregoing space problems involved placing the labels below their associated icons in a horizontally oriented toolbar. While this creates more horizontal space, it reduces valuable vertical real estate on the computer monitor screen. Most monitor screens are wider than they are high. Thus, the loss of vertical viewing space to a toolbar is less desirable than taking up horizontal space. Additionally, in the case of a vertically oriented toolbar, placing the labels below the icons makes the situation worse.

Another attempt at resolving the toolbar resizing issue involved arbitrarily removing buttons from the toolbar in a right to left'sequence for a horizontally oriented toolbar. Presumably, the same procedure could be employed for vertically oriented toolbars by removing buttons in a bottom up sequence. In other words the rightmost (or bottommost) buttons are eliminated until the remaining buttons can fit in the downsized toolbar space. This method has obvious drawbacks. The primary advantage of a toolbar is to conveniently present the user access to a variety of functions and commands while the user is running the associated program. If buttons are removed from the toolbar during downsizing, the user must access the functions and commands associated with the eliminated buttons via other less convenient methods, such as by accessing a menu and selecting the function from a displayed list.

Still another attempt at dealing with the both the toolbar size restrictions and the downsizing issue involved a feature by which the inclusion of labels with the icons could be turned off. In other words, in one state the icons appeared with labels, and in the other state, no icon appeared with a label. While "turning off" the labels increases the number of icons that can be included in a tool bar and allows for the downsizing of the toolbar space without the loss of as many buttons, the advantages of having labels is lost. The labels, which are typically one or two words, provide a convenient way for the user to identify the function or state of the associated icon without having to memorize the appearance of the icon and the function it represents. Thus, removing all the labels reduces the usability of the toolbar.

Another issue with existing-toolbar designs involves a situation opposite that of the system resolution problem described earlier where a toolbar designed for a higher resolution system is viewed on a lower resolution system. In some cases, toolbars which have been designed to maximize the space assuming a particular lower resolution, will be viewed on a system having a higher resolution. The result is that all the buttons associated with the toolbar that would have filled the available toolbar space in the lower resolution system for which it was designed, will only fill a portion of the space when viewed on the higher resolution system. For example, FIG. 1A shows a tool bar employed in an older version of Microsoft Corporation's Outlook Express® email program that was optimized for a resolution of 640×480 pixels. FIG. 1B shows this same toolbar displayed on a system having a resolution of 800×600 pixels. Notice the blank space to the right of the last button. Some users find this wasted space quite irritating, especially when it is realized that additional buttons cannot be added to this wasted space.

SUMMARY

The present invention is directed toward a system and process that overcomes the problems of existing toolbar schemes by effectively dealing with the size limitations and changes in size of a toolbar, while maintaining as much of the convenience and usability attributed to a toolbar as possible. This is accomplished by creating a dynamically adjustable toolbar where labels and icons are added or removed based on an assigned priority in view of the space available for displaying the toolbar. The toolbar can be a horizontally oriented toolbar employing labels to the side of the icon or a vertically oriented toolbar employing labels underneath the icon.

Generally, the dynamically adjustable toolbar is generated and displayed by first identifying all the functions or commands that it is desired to include in a toolbar along with their respective button icons and labels (if there is one). A priority is then assigned to each label associated with a button and each icon associated with a button. It is noted that in the case of the icons, it does not matter if the icon has an associated label or not. If it has a label it is prioritized as if it did not. Next, the available toolbar space is determined. The button icons and labels are then displayed in the available toolbar space based on their assigned priority, with the icons and labels having the higher assigned priorities being displayed before those having lower priorities. In this way the toolbar button icons and labels that are deemed most important are displayed in the available toolbar space. Typically, this will mean that labels are the first to be eliminated from consideration for display in the available toolbar space since they would preferably be given a lower priority that the button icons. However, this need not be the case. In some circumstances, it might be deemed that the display of a label adjacent a button icon is more important than displaying some less important button. Thus, the label would be assigned a higher priority than the icon (and label if there is one) associated with the less important button. In this way, the less important button would be eliminated before the aforementioned label if the toolbar space is too limited to include both. Further, it is noted that the priority of a button's icon is preferably made higher than its associated label to prevent a situation where the icon associated with the button is removed before the label. This will prevent confusion as to what icon is associated with a label and what needs to be selected to access the function.

There may also be circumstances where it is desired that if there is no room for a label associated with a particular button based on the assigned priorities, the entire button be eliminated rather than just the label. One way of ensuring that an icon and label associated with a toolbar button are displayed or eliminated together is to implement a shared priorities scheme. A shared priority is created by assigning the same priority to both the icon and label. The present system and process interprets the shared priorities as binding the affected elements such that they must be displayed together if there is room or neither is displayed if there is not room for both in the available toolbar space. Thus, the decision as to what is to be displayed in the available toolbar space would involve choosing among the icons, labels, and combinations of icons and/or labels that are tied together by a shared priority, and selecting the items based on their priority from highest to lowest until the available space is exhausted. It is further noted that the shared priority scheme could be expanded to include combinations of icons and/or labels that are not associated with the same toolbar button. In these cases, the elements having a shared priority could stand or fall together as described above, or another method could be used to determine which is eliminated from being displayed in the available toolbar space should there not be room for all of them. For example, the rightmost element having a shared priority in a horizontally oriented toolbar could be eliminated first. Similarly, the bottom-most element having a shared priority in a vertically oriented toolbar could be eliminated first.

The priorities assigned to each toolbar item (i.e., labels, icons, and combinations thereof) can be selected in a number of ways. For example, the priorities can be pre-assigned based on what is believed to be the order of importance and not subject to change. Alternately, a set of pre-assigned priorities would be initially implemented, but thereafter, the frequency of use of the various function and commands associated with the toolbar would be tracked. Conventional statistical methods would then be employed to dynamically re-prioritize the items associated with a toolbar based on the frequency of use data, thereby tailoring the toolbar priorities to the user. Finally, the priority scheme could be user-defined such that the priority of some or all the items would be designated by the user. In this last scenario, the program could initially employ the aforementioned pre-set priorities, and the user could change them as desired.

As can be imagined, once the priorities are assigned, the toolbar according to the present invention is completely dynamic. When it is initial displayed, the designated priorities determine which of the buttons with or without labels are included based on the available space. It does not matter what the computer system's resolution is, as the maximum number of high priority buttons are included in any case. The only difference is that more elements are included if the resolution is higher. Further, any time the size of the toolbar changes for the reasons described earlier, the priorities can be used again to optimize the toolbar's configuration. In the case where the toolbar space is increased, additional buttons, or labels for existing buttons, or both, are added to fill the additional space based on their assigned priority (i.e., highest first). If the toolbar space is reduced, buttons or labels associated with buttons are removed—again based on their priority. In this latter case, the lowest priority items are removed until the new reduced space is filled with the remaining higher priority items.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 2:
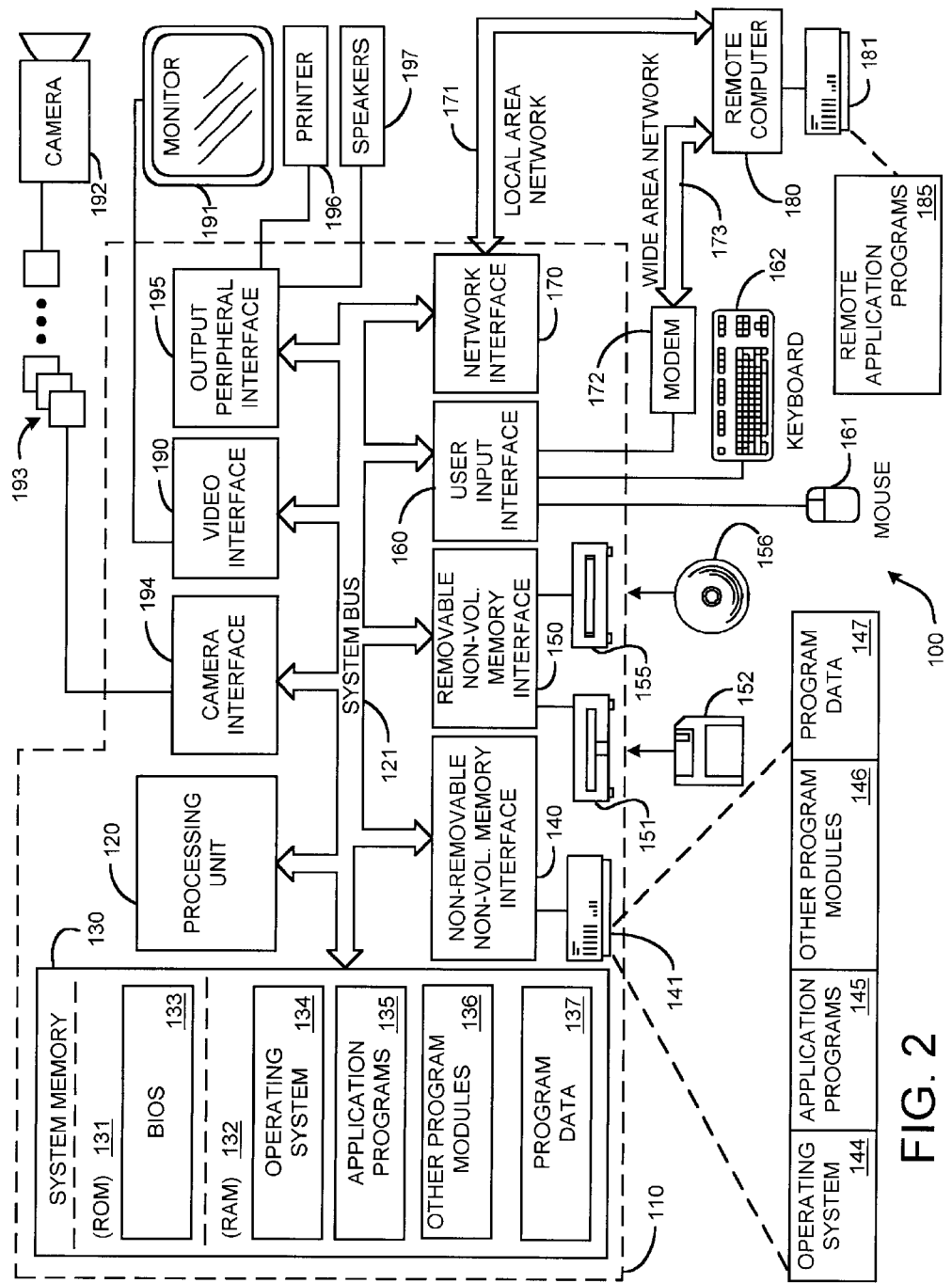
FIG. 2 is a diagram depicting a general purpose computing device constituting an exemplary system for implementing the present invention.

Before providing a description of the preferred embodiments of the present invention, a brief, general description of a suitable-computing environment in which the invention may be implemented Will be described. FIG. 2 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced. ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
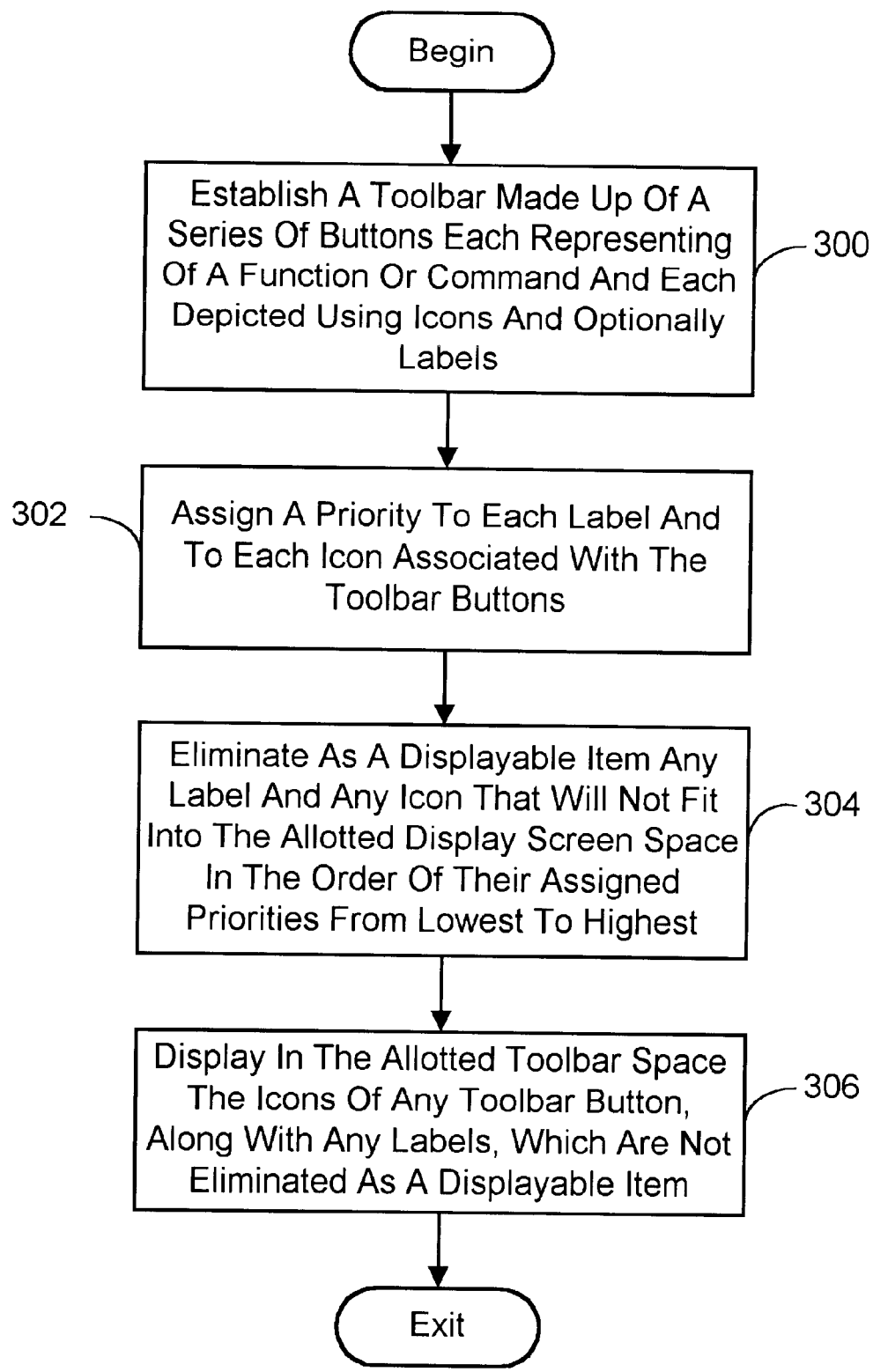
FIG. 3 is a flow chart diagramming an overall process for generating and displaying a dynamically adjustable toolbar in an allotted space on a display screen in accordance with the present invention.

The exemplary operating environment having now been discussed, the remaining part of this description section will be devoted to a description of the program modules embodying the invention. Essentially, the system and process according to the present invention involves creating a dynamically adjustable toolbar where labels and icons are added or removed based on an assigned priority in view of the space available for displaying the toolbar. This dynamically adjustable toolbar can be a horizontally oriented toolbar employing labels to the side of the icon, or a vertically oriented toolbar employing labels underneath the icon. In general, a dynamically adjustable toolbar can be generated via the following process actions, as shown in the high-level flow diagram of FIG. 3:

a) establishing a toolbar made up of a series of toolbar buttons each representative of a particular function or command and made up of icons with or without associated text elements hereinafter referred to as labels (process action 300);

b) assigning a priority to each label associated with a toolbar button and each icon associated with a toolbar button (process action 302);

c) eliminating from consideration as a displayable item any label and any icon without a label or with an eliminated label, in the order of their assigned priorities from the lowest to the highest, which will not fit into an allotted space on the display screen (process action 304); and d) displaying the icons of any toolbar button, along with any labels associated with these icons, which are not eliminated from consideration as a displayable item, in the allotted toolbar space (process action 306).

Figure 1A:
FIG. 1A is an image of a toolbar generated in an older version of Microsoft Corporation's Outlook Express® email program that was optimized for a resolution of 640×480 pixels and displayed on a system having that resolution.
Figure 1B:
FIG. 1B is an image of a toolbar generated in an older version of Microsoft Corporation's Outlook Express® email program that was optimized for a resolution of 640×480 pixels, but displayed on a system having a resolution of 800×600 pixels.
Figure 5A:
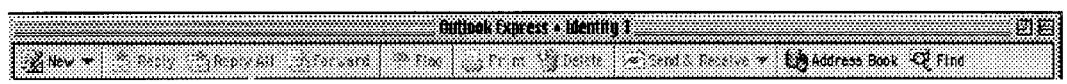
FIG. 5A is an image of a toolbar generated by a version of Microsoft Corporation's Outlook Express® email program which is displayed in a toolbar space large enough to include all the desired toolbar button icons with associated labels.
Figure 6:
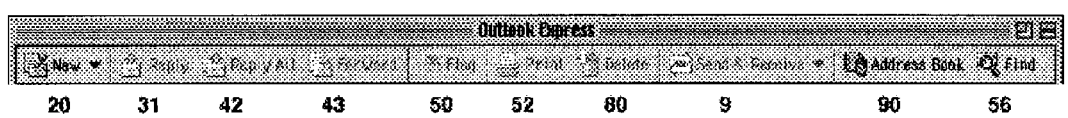
FIG. 6 is the image of a toolbar generated by a version of Microsoft Corporation's Outlook Express® email program depicted in FIG. 5A, with examples of the priorities that might be assigned to the labels associated with the buttons of a toolbar as shown by the bolded numbers disposed below the buttons.
Figure 4:
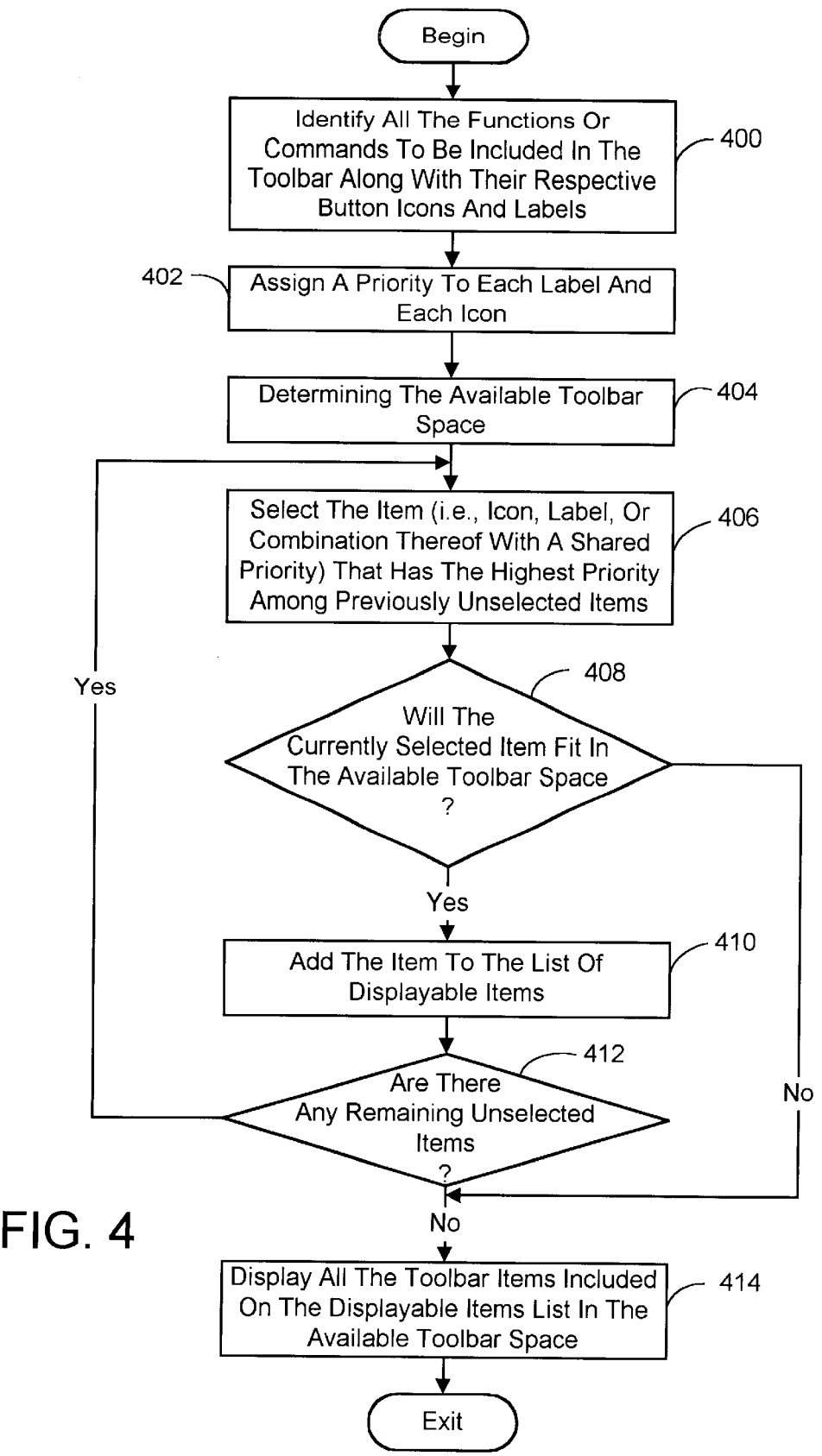
FIG. 4 is a flow chart diagramming a more detailed process for implementing the process outlined in FIG. 3 to generate and display a dynamically adjustable toolbar.

More particularly, this general process of generating a dynamically adjustable toolbar can be implemented as outlined in FIG. 4. First, all the functions or commands that it is desired to include in a toolbar are identified along with their respective buttons (process action 400). For example, as illustrated in FIG. 5A, the depicted toolbar from a version of Microsoft Corporation's Outlook Express® email program includes a button for creating a new email message labeled new, buttons for replying to specific or all the listed senders of an email message, as well as forwarding, flagging, printing, and deleting an email message. There are also buttons providing links to a send and receive function, an address book and a find utility. Notice there is a small blank space to the right of the last button in FIG. 5A. This is due to there being no other buttons currently identified for the depicted toolbar. Once all the functions and commands are identified, a priority is assigned to each label associated with a button and each icon associated with a button (process action 402). It is noted that in the case of the icons, it does not matter if the icon has an associated label or not, it is prioritized separately. An example of the priorities that might be assigned to the labels associated with the buttons of a toolbar is illustrated in FIG. 6 by the bolded numbers disposed below the buttons of the toolbar from a version of Microsoft Corporation's Outlook Express® email program. In this case, the lower the number, the higher the priority. Only the label priorities are shown in the depicted example, however, there are also priorities associated with the individual icons as well.

The priorities for each button icon and label can be designated in a number of ways. First, a prescribed priority system could be employed where the priority of each item is pre-selected by the toolbar's programmer based on what is believed to be the order of importance. In such a case the priority scheme would be invisible to the user. In a second embodiment of the priority designation process, a set of pre-selected priorities would be initially assigned to each element by the programmer. However, thereafter, the program would track the frequency of use of the various function and commands associated with the toolbar. Conventional statistical methods would then be employed to dynamically re-prioritize the items associated with a toolbar based on the number of times the user accesses each of the affected functions and commands, thereby tailoring the toolbar priorities to the user. Finally, the priority scheme could be user-defined such that the priority of some or all the elements would be designated by the user. In this last scenario, the program could initially employ the aforementioned pre-set priorities as default settings, and the user could change them as desired.

Referring again to FIG. 4, the process for generating a dynamically adjustable toolbar continues by determining the available toolbar space, as indicated by process action 404. As discussed previously, the available space will be influenced by a number of factors, including the space currently allotted to the toolbar in the program, the size of the computer monitor screen, and the resolution of the system. The button icons and labels are then displayed in the available toolbar space based on their assigned priority. In cases where the toolbar space is large enough, every desired icon and its associated label (if there is one) would be displayed. However, if the space is not adequate to display all the icons and their associated labels, then items are eliminated based on their assigned priority. For example, if lower priorities are attached to labels, they would be eliminated and only the icons associated with the removed labels would be displayed. Granted, the convenience associated with the easy identification of a function or command afforded by the removed label would be lost. However, this advantage remains for all the higher priority labels that are not removed. This is unlike current toolbars with would require the "turning off" of all the labels regardless of their importance. In addition, eliminating labels to create space is advantageous when compared to the method of eliminating an entire button, label and all, as is done with the rightmost button in some current toolbar configurations. Specifically, the convenience associated with a toolbar button, albeit without a label, is retained.

It is possible, however, that a button having an icon and label is considered to be a higher priority for display than the icon of another button that either never had an associated label or whose label has been previously eliminated because of limited toolbar space. Thus, in this example, some labels would be assigned a higher priority than a button icon. In such a case, the button icons would be eliminated from consideration as a displayable item if there still is not enough room and all the labels with lower priorities than the icon have been eliminated.

It is also preferred that the priority of a button's icon is made higher than its associated label to prevent a situation where the icon associated with the button is removed before the label. In other words, it is preferred that a label never exist in the toolbar without an associated icon to prevent confusion as to what icon is associated with a label and what needs to be selected to access the function.

There may also be circumstances where it is desired that if there is no room for a label associated with a particular button based on the assigned priorities, the entire button be eliminated rather than just the label. For example, a button may be associated with a little-used feature, which if selected by mistake could have detrimental effect. In such a case, it is possible that if the identifying label is removed, the remaining icon of the button might be confused by the user as representing another function. Accordingly, it would be more desirable to eliminate the button completely rather than just removing the label. The user would then access this function via other methods, such as selecting the function in a drop-down contextual items list. Thus, there may be some circumstances where a button having an icon-label combination is considered to have a lower display priority than a label and/or icon of another button. This situation is handled in the present toolbar system and process by employing a shared priorities scheme. A shared priority occurs when the same priority is assigned to more than one item. These items would be tied together in that all must be displayed or none are displayed in the toolbar. Thus, for example, the aforementioned icon and label associated with the button representing the aforementioned little-used function would be assigned the same shared priority. If there is room in the toolbar for both, then the icon is displayed with its corresponding label. However, if there is not enough room for both, and other icons and labels associated with other buttons have higher priorities, the entire button is not display or removed as the case may be. In this way, the most important buttons, including ones having labels that are considered high priority are displayed in the available toolbar space, while the more unimportant buttons are not. This is opposed to current toolbar systems which arbitrarily remove buttons with or without labels without regard to their importance.

The concept of a shared priority could also be extended to unrelated buttons and labels as well. A shared priority assigned to two unrelated items could be handled as described above for related items—namely, they stand or fall together. Alternately, a shared priority on unrelated items could be handled by eliminating or not displaying the rightmost of the items for horizontally oriented toolbars employing labels to the side of the icon and the bottommost items for vertically oriented toolbars employing labels underneath the icon.

Referring once again to FIG. 4, the specifics of displaying the button icons and labels based on their assigned priority will be explained. This part of the process is accomplished by first selecting the item associated with the toolbar under consideration that has the highest priority among the previously unselected items (process action 406). For the purposes of this description, a toolbar item will be deemed to include a button icon, a button label, or any combinations thereof in the case of a shared priority. Thus in some cases an item can include multiple elements. It is next determined in process action 408 whether the currently selected item will fit in the available toolbar space. If it will fit, the item is added to a list of displayable items (process action 410). It is then determined if there are any remaining unselected items associated with the toolbar under consideration, as indicated by process action 412. If there are, the process of actions 406 through 412 are repeated for the next highest priority item, and so on, until it is determined in process action 408 that the selected item will not fit or it is determined in process action 412 that there are no more items to select. At that point, all the toolbar button items included on the displayable items list are displayed in the available toolbar space with the icons and label associated with the same toolbar button being displayed adjacent each other (process action 414). Preferably, if the toolbar is horizontally oriented on the display screen the labels associated with a toolbar button are displayed to the right of the icon associated with the same button. Whereas, in the case where the toolbar is vertically oriented on the display screen, it is preferred that the labels associated with a toolbar button are displayed below the icon associated with the same button.

Figure 5B:
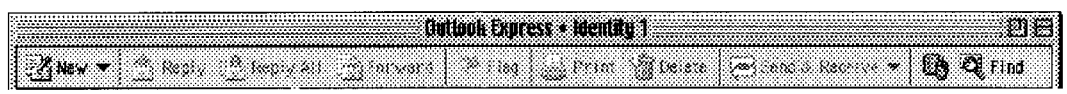
FIG. 5B is an image of a toolbar generated by a version of Microsoft Corporation's Outlook Express® email program which shows the toolbar of FIG. 5A displayed in a reduced toolbar space.

As can be imagined, once the priorities are assigned, the toolbar according to the present invention is completely dynamic. When it is initial displayed, the designated priorities determine which of the buttons with or without labels are included based on the available space. It does not matter what the computer system's resolution is, as the maximum number of high priority buttons are included in any case. The only difference is that more toolbar items are included if the resolution is higher. Further, any time the size of the toolbar changes for the reasons described earlier, the priorities again optimize the toolbar's configuration. In the case where the toolbar space is increased, additional buttons, or labels for existing buttons, or both, are added to fill the additional space based on their assigned priority, as will be described shortly. If the toolbar space is reduced, labels associated with buttons or entire buttons (icons with or without labels) are removed—again based on their priority. For example, FIG. 5A shows a toolbar from a version of Microsoft Corporation's Outlook Express® email program which is displayed in a toolbar space large enough to include all the desired button icons with associated labels. FIG. 5B shows the same toolbar displayed in a reduced toolbar space. It will be noticed that the label reading "Address Book" originally included to identify the address book button (i.e., the second button from the right) in the toolbar displayed in FIG. 5A has been eliminated in the downsized toolbar shown in FIG. 5B. This is consistent with that label having the lowest priority as illustrated the listed label priorities in FIG. 6. With the lowest priority label eliminated, the remaining higher priority buttons with icon-label combinations and the button icon for the address book link remain, thus optimizing the toolbar within the space available. If the space where made even smaller, the lowest priority items are removed in sequence based on their assigned priorities until the new reduced space is filled with the remaining higher priority items. Conversely, if the toolbar space is increase, the previously removed or previously un-displayed items would be added until the newly increased space is filled with the as many of the highest priority items as possible. In this manner, for the first time, the addition or loss of buttons in a toolbar is optimized with the available space being filled with buttons associated with the most important functions and commands as possible.

Figure 7A:
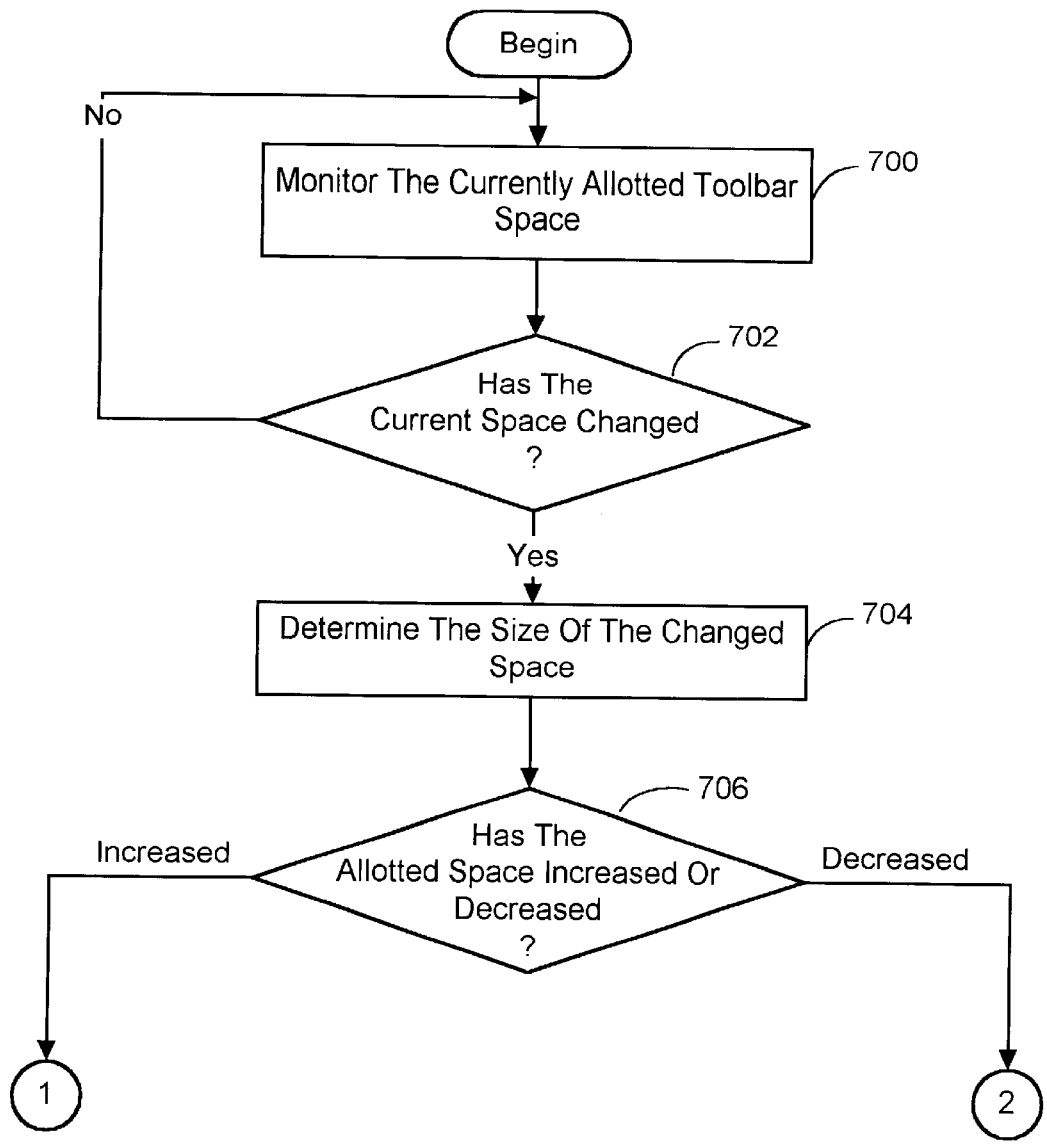
FIGS. 7A–C depict a flow chart diagramming a process for optimizing the configuration of the dynamically adjustable toolbar generated in accordance with FIG. 3 in view of a resizing of the allotted display space.
Figure 7B:
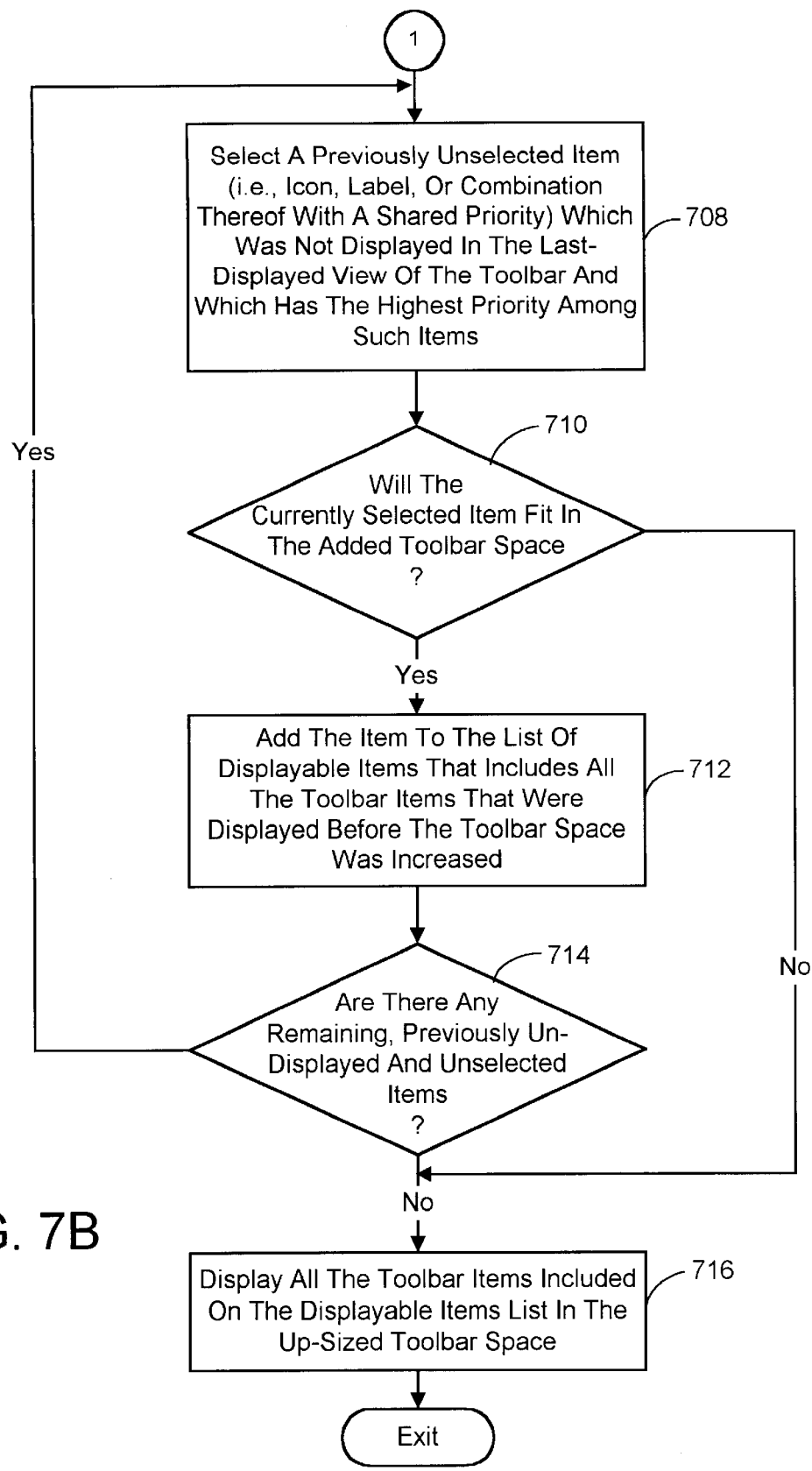
Figure 7C:
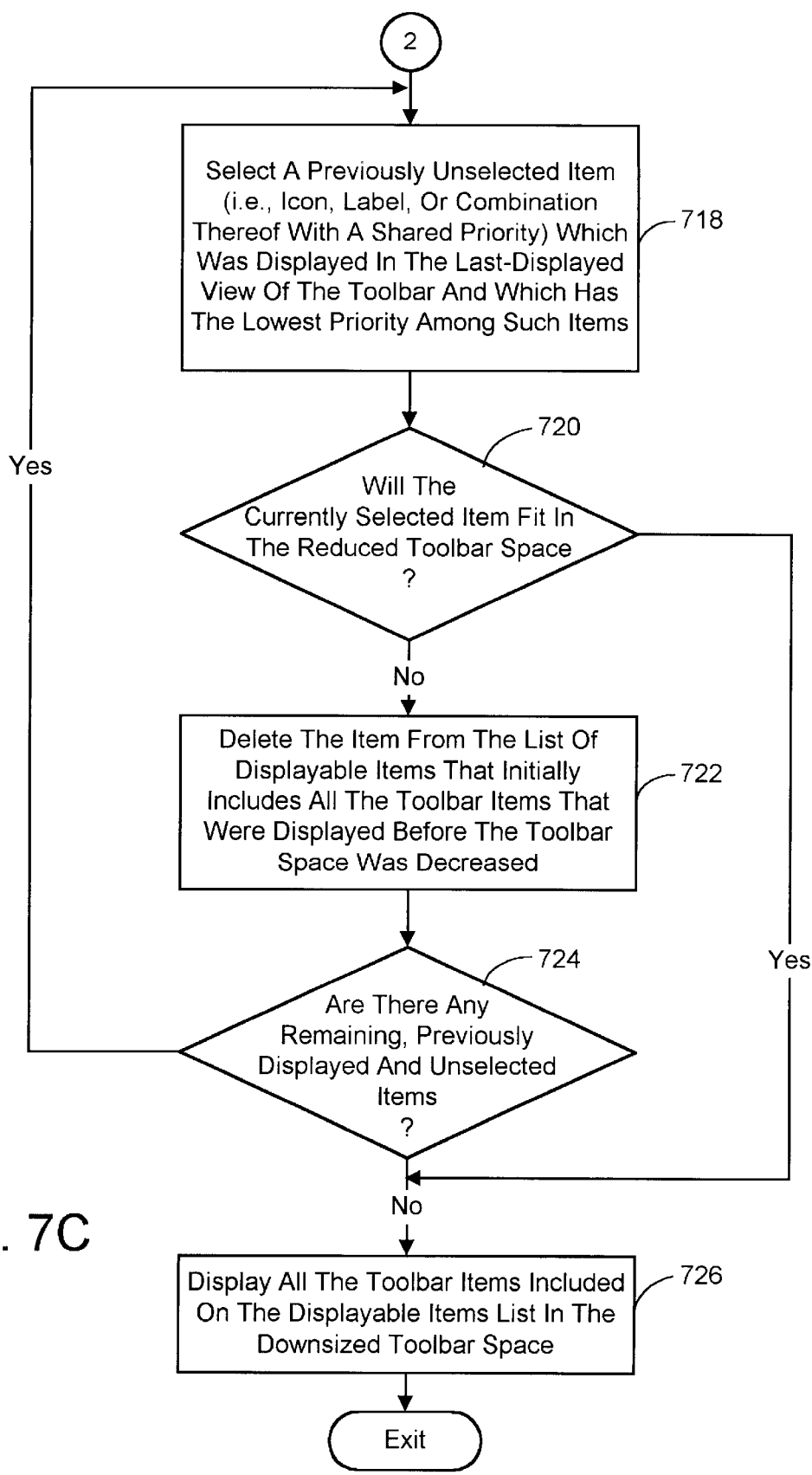

Referring to FIGS. 7A–C, a process will now be described for implementing the above-described optimization of the toolbar configuration in view of a resizing of the allotted display space. The currently allotted toolbar space in the open application under consideration is monitored (process action 700), and as indicated by process action 702, it is determined if the current space has changed. If it the available toolbar space has not changed, the monitoring continues. However, if the allotted space changes, the size of the new space is determined (process action 704) and it is ascertained whether the allotted space has increased or decreased (process action 706). Referring now to FIG. 7B, if the space has increased, an item associated with the toolbar under consideration, which was not displayed in the last-displayed view of the toolbar and which has the highest priority among such items, is selected (process action. 708). It is next determined in process action 710 whether the currently selected item will fit in the newly added space. If it will fit, the item is added to a list of displayable items that includes all the toolbar items that were displayed before the toolbar space was increased (process action 712). It is then determined in process action 714 whether there are any remaining, previously un-displayed and unselected items associated with the toolbar. If so, process actions 708 through 712 are repeated for each remaining item having the highest assigned priority among the remaining items, until it is determined via process action 710 that the currently selected item will not fit in the available toolbar space, or it is determined via process action 714 that there are no remaining items to consider. When either of these occurs, all the toolbar button items then included on the displayable items list are displayed in a new view representing the up-sized toolbar, as indicated by process action 716. It is noted that the foregoing process could result in no additional items being added to the displayable items list whenever the new toolbar space, albeit larger, is not big enough to fit in any additional items.

If, however, it is determined in process action 706 that the toolbar space has decreased the process would be different. Specifically, referring to FIG. 7C, the item displayed in the last-displayed view of the toolbar under consideration that has the lowest priority among the displayed items is selected (process action 718). It is then determined in process action 720 whether the currently selected item will fit in the newly reduced toolbar space. If it will not fit, then the item is deleted from a list of displayable items that initially includes all the toolbar items that were displayed before the toolbar space was decreased (process action 722). It is next determined in process action 724 whether there are any remaining, previously displayed and unselected items associated with the toolbar. If so, process actions 718 through 724 are repeated for each remaining item having the lowest assigned priority among the remaining items, until it is determined via process action 720 that the currently selected item will fit in the available toolbar space, or it is determined via process action 724 that there are no remaining items to consider. When either of these occurs, all the toolbar button items remaining on the displayable items list are displayed in a new view representing the downsized toolbar (process action 724). It is noted that the foregoing process could result in none of previously displayed items being eliminated from the displayable items list whenever the new reduced toolbar space is not made so much smaller that all the currently displayed items cannot still fit.

While, the foregoing description assumes that the priorities are set separately for each toolbar, this need not be the case. Often the same functions and commands are employed in more than one toolbar of an application. If these duplicate functions and commands have similar priorities in each of the toolbars in relation to the remaining functions and command of the toolbar, it would be possible to implement a global priority scheme. In a global priority scheme, all the functions and command associated with any toolbar of the program are identified and assigned a priority. These priorities would then be employed as described previously for all the items associated with a particular toolbar being rendered for display. It is further possible to include some but not all the toolbars of a program in the global priority scheme. If, for instance, it is desired to employ different priorities in a particular toolbar than would be the case if the global priorities were applied, that toolbar could be prioritized separately.

Finally, it is noted that while the priority scheme described above prioritizes labels, icons and buttons with icon-label combinations, more limited embodiments are also possible. For example, just the labels could be prioritized. In such an embodiment, the labels would be displayed, added or removed, as the case may be, based on their assigned priorities without regard to the icons associated with the buttons. Conventional methods could be employed to handle situations where there is still not enough space available even if none of the labels are displayed.

While the invention has been described in detail by specific reference to preferred embodiments thereof, it is understood that variations and modifications thereof may be made without departing from the true spirit and scope of the invention.

Wherefore, what is claimed is:

1. A computer-implemented process for displaying in an allotted space on a display screen a toolbar made up of a series of toolbar buttons each representative of a particular-function or command and comprising icons with or without associated labels, said process comprising the actions of:

assigning a priority to each label associated with an icon of a toolbar button and each icon associated with a toolbar button;

eliminating from consideration as a displayable item any label and any icon without a label or with an eliminated label, in the order of their assigned priorities from the lowest to the highest that will not fit into the allotted space; and, displaying the icons of any toolbar button, along with any labels associated with these icons, which are not eliminated from consideration as a displayable item, in the allotted toolbar space.

2. The process of claim 1, wherein the process action of assigning a priority to each label and icon comprises an action of assigning the same priority to more than one label or icon, and wherein the process action of eliminating from consideration as a displayable item any label and any icon that will not fit into the allotted space, further comprises an action of eliminating from consideration as a displayable item any combination of labels, icons, or labels and icons having the same assigned priority, in the order of the assigned priorities for each label, icon, and combination of labels and icons, from the lowest to the highest, that will not fit into the allotted space.

3. The process of claim 2, wherein the process action of assigning the same priority to more than one label or icon, comprises assigning the same priority to only labels and icons associated with the same toolbar button.

4. The process of claim 1, wherein the toolbar is displayed horizontally on the display screen, and wherein the process action of assigning a priority to each label and icon comprises an action of assigning the same priority to more than one label or icon each of which is associated with a different toolbar button, and wherein the process action of eliminating from consideration as a displayable item any label and any icon that will not fit into the allotted space further comprises an action of eliminating from consideration as a displayable item the rightmost one of any combination of labels, icons, or labels and icons having the same assigned priority, in the order of the assigned priorities for each label, icon and combination of labels, icons or labels and icons, from the lowest to the highest, that will not fit into the allotted space.

5. The process of claim 1, wherein the toolbar is displayed vertically on the display screen, and wherein the process action of assigning a priority to each label and icon comprises an action of assigning the same priority to more than one label or icon each of which is associated with a different toolbar button, and wherein the process action of eliminating from consideration as a displayable item any label and any icon that will not fit into the allotted space further comprises an action of eliminating from consideration as a displayable item the bottom-most one of any combination of labels, icons, or labels and icons having the same assigned priority, in the order of the assigned priorities for each label, icon and combination of labels, icons or labels and icons, from the lowest to the highest, that will not fit into the allotted space.

6. The process of claim 1, wherein the process action of assigning a priority to each label and icon, comprises an action of employing a set of prescribed priorities not alterable by a user of the process.

7. The process of claim 1, wherein the process action of assigning a priority to each label and icon, comprises an action of employing a set of prescribed priorities as default settings at least some of which are alterable by a user of the process.

8. The process of claim 1, wherein the process action of assigning a priority to each label and icon, comprises the actions of:

initially employing a set of prescribed priorities as default settings;
    tracking the frequency a user of the process selects each function and command represented by a toolbar button;
    dynamically re-assigning the priority of each label and icon associated with the toolbar buttons based on the frequency that the user selects the function or command represented by the toolbar button.

9. The process of claim 8, wherein the process action of dynamically re-assigning the priority of each label and icon, comprises an action of assigning the priorities in the order of the frequency that the user selects the function or command represented by the toolbar button associated with the label or icon.

10. The process of claim 1, wherein the process action of assigning a priority to each label and icon associated with a toolbar button, comprises an action of assigning a higher priority to an icon associated with a toolbar button than to a label associated with the same button, so that the label would be eliminated from consideration as a displayable item before the icon.

11. A computer-implemented process for displaying a toolbar in an allotted space on a display screen, comprising using a computer to perform the following process actions:

identifying functions and commands it is desired to access from the toolbar;
    establishing a set of toolbar buttons which are employed to represent each of the identified functions or commands, wherein each toolbar button comprises an icon and optionally a label;
    assigning a priority to each label associated a toolbar button and each icon associated with a toolbar button, wherein the assigned priority is indicative of the importance of including the associated icon or label in the display of the toolbar;
    displaying in the allotted space of the display screen as many of the icons and labels that will fit in the allotted space as possible based on their assigned priority, with icons and labels having a higher assigned priority being displayed over those with a lower assigned priority.

12. The process of claim 11, wherein the process action of displaying in the allotted space of the display screen as many of the icons and labels that will fit in the allotted space as possible based on their assigned priority, comprises the actions of:

(a) determining the amount of space allotted on the display screen for displaying the toolbar;
    (b) selecting the icon or label having the highest assigned priority as a currently selected toolbar element;
    (c) adding the currently selected element to a list of displayable elements;
    (d) ascertaining if there are any remaining, previously unselected icons or labels, and if so selecting the remaining icon or label having the highest assigned priority as the currently selected toolbar element in lieu of the last-selected element;
    (e) determining whether the currently selected element will fit in the remaining allotted toolbar display space;
    (f) whenever the currently selected element will fit in the remaining allotted display space, adding the element to the list of displayable elements;
    (g) repeating actions (d) through (f), until there are no remaining, previously unselected icons or labels, or it is determined that the currently selected element will not fit in the remaining allotted toolbar space;
    (h) display the icons and labels on the list of displayable items in the allotted toolbar space, with the icons and labels associated with the same toolbar button being displayed adjacent each other.

13. The process of claim 12, wherein the toolbar is displayed horizontally on the display screen, and wherein the process action of displaying the icons and labels on the list of displayable items in the allotted toolbar space, comprises displaying any label associated with a toolbar button to the right of the icon associated with the same button.

14. The process of claim 12, wherein the toolbar is displayed vertically on the display screen, and wherein the process action of displaying the icons and labels on the list of displayable items in the allotted toolbar space, comprises displaying any label associated with a toolbar button below the icon associated with the same button.

15. The process of claim 11, wherein the allotted toolbar space is subject to change, and wherein the process further comprises the process actions of:

monitoring the allotted toolbar space for changes in size;
    determining the new allotted toolbar space whenever the space is re-sized;
    ascertaining whether the new allotted toolbar space is larger or smaller than the previous allotted toolbar space;
    whenever it is ascertained that the new allotted toolbar space is larger than the previous allotted space, additionally displaying as many of the icons and labels which were not displayed in the previously allotted toolbar space that will fit in the added space associated with the new allotted toolbar space based on their assigned priority, with icons and labels having a higher assigned priority being displayed before those with a lower assigned priority; and
    whenever it is ascertained that the new allotted toolbar space is smaller than the previous allotted space, eliminating from the toolbar display any of the icons and labels which were displayed in the previously allotted toolbar space that will not fit in the reduced space associated with the new allotted toolbar space based on their assigned priority, with icons and labels having a lower assigned priority being eliminated before those with a higher assigned priority.

16. The process of claim 15, wherein the process action of additionally displaying as many of the icons and labels which were not previously displayed in the previously allotted toolbar space that will fit in the added space associated with the new allotted toolbar space whenever it is ascertained that the new allotted toolbar space is larger than the previous allotted space, comprises the actions of:

(a) selecting an icon or label which was not displayed in the previously allotted toolbar space and has the highest assigned priority among the other icons and labels not displayed in the previously allotted toolbar space as a currently selected additional toolbar element;
    (b) determining whether the currently selected additional element will fit in the added space associated with the new allotted toolbar display space;
    (c) whenever the currently selected additional element will fit in the added space, adding the element to a list of displayable elements which includes all the elements displayed in the previous allotted toolbar space;
    (d) ascertaining if there are any remaining, previously unselected icons or labels which were not displayed in the previously allotted toolbar space, and if so selecting the remaining icon or label having the highest assigned priority as the currently selected additional toolbar element in lieu of the last-selected element;

(e) determining whether the currently selected additional element will fit in the remaining added space associated with the new allotted toolbar space;

(f) whenever the currently selected additional element will fit in the remaining added space adding the element to the list of displayable elements;

(g) repeating actions (d) through (f), until there are no remaining, previously unselected icons or labels which were not displayed in the previously allotted toolbar space, or it is determined that the currently selected additional element will not fit in the remaining added space;

(h) display the icons and labels on the list of displayable items in the increased toolbar space, with the icons and labels associated with the same toolbar button being displayed adjacent each other.

17. The process of claim 15, wherein the process action of eliminating from the toolbar display any of the icons and labels which were displayed in the previously allotted toolbar space that will not fit in the reduced space associated with the new allotted toolbar whenever it is ascertained that the new allotted toolbar space is smaller than the previous allotted space, comprises the actions of:

(a) selecting the icon or label which was displayed in the previously allotted toolbar space that has the lowest assigned priority among the other icons and labels displayed in the previously allotted toolbar space as a currently selected eliminatable toolbar element;

(b) determining whether the currently selected eliminatable element will fit in the reduced space associated with the new allotted toolbar display space;

(c) whenever the currently selected eliminatable element will not fit in the added space, deleting that element from a list of displayable elements which initially includes all the elements displayed in the previous allotted toolbar space;

(d) ascertaining if there are any remaining, previously unselected icons or labels which were displayed in the previously allotted toolbar space, and if so selecting the remaining icon or label having the lowest assigned priority as the currently selected eliminatable toolbar element in lieu of the last-selected element;

(e) determining whether the currently selected eliminatable element will fit in the reduced space associated with the new allotted toolbar space;

(f) whenever the currently selected eliminatable element will not fit in the reduced space, deleting that element from the list of displayable elements;

(g) repeating actions (d) through (f), until there are no remaining, previously unselected icons or labels which were displayed in the previously allotted toolbar space, or it is determined that the currently selected eliminatable element will fit in the remaining added space;

(h) display the icons and labels on the list of displayable items in the reduced toolbar space, with the icons and labels associated with the same toolbar button being displayed adjacent each other.

18. A computer-implemented process for displaying toolbars in respective allotted spaces on a display screen, comprising using a computer to perform the following process actions:

identifying functions and commands to access from each of the toolbars;

establishing a set of toolbar buttons which are employed to represent each of the identified functions or commands, wherein each toolbar button comprises an icon and optionally a label;

assigning a priority to each label associated with a toolbar button of the toolbars and each icon associated with a toolbar button of the toolbars, wherein the assigned priority is indicative of the importance of including the associated icon or label in the display of any of the toolbars;

displaying in the allotted space associated with at least one of the toolbars, as many of the icons and labels associated with that toolbar that will fit in the allotted space based on their assigned priority, with icons and labels having a higher assigned priority being displayed over those with a lower assigned priority.

19. A computer-implemented process for displaying a toolbar in an allotted space on a display screen, comprising using a computer to perform the following process actions:

identifying functions and commands to access from the toolbar;

establishing a set of toolbar buttons which are employed to represent each of the identified functions or commands, wherein each toolbar button comprises an icon and optionally a label;

assigning with a priority to each label associated a toolbar button, wherein the assigned priority is indicative of the importance of including the associated label in the display of the toolbar;

displaying in the allotted space of the display screen as many of the labels that will fit in the allotted space as possible based on their assigned priority, with labels having a higher assigned priority being displayed over those with a lower assigned priority.

20. A system for displaying a toolbar in an allotted space on a computer monitor display screen, comprising:

a general purpose computing device;

a computer monitor which has a display screen and which is in communication with the computing device; and a computer program comprising program modules executable by the computing device, wherein the computing device is directed by the program modules of the computer program to, identify functions and commands to access from the toolbar;

establish a set of toolbar buttons which are employed to represent each of the identified functions or commands, wherein each toolbar button comprises an icon and optionally a label;

assign a priority to each label associated with a toolbar button and each icon associated with a toolbar button, wherein the assigned priority is indicative of the importance of including the associated icon or label in the display of the toolbar, eliminate from consideration as a displayable item any label and any icon without a label or with an eliminated label, in the order of their assigned priorities from the lowest to the highest that will not fit into the allotted space; and, display the icons of any toolbar button, along with any labels associated with the button, which are not eliminated from consideration as a displayable item, in the allotted toolbar space of the display screen.

21. A computer-readable medium having computer-executable instructions for displaying in an allotted space on a display screen, a toolbar made up of a series of toolbar buttons each representative of a particular function or command and comprising icons with or without associated labels, said computer-executable instructions comprising:

assigning a priority to each label associated with a toolbar button and each icon associated with a toolbar button, wherein the assigned priority is indicative of the importance of including the associated icon or label in the display of the toolbar;

displaying in the allotted space of the display screen as many of the icons and labels that will fit in the allotted space based on their assigned priority, with icons and labels having a higher assigned priority being displayed over those with a lower assigned priority.

* * * * *